Figure 9:
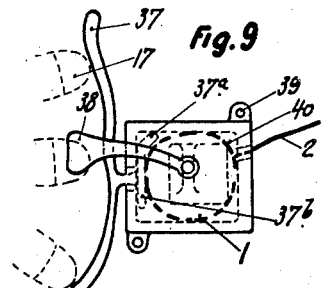

Jan. 27, 1942.    G. A. RUBISSOW    2,270,900
VOLUMETRIC COMMAND-DEVICE FOR CONTROLLING OF OPERATION OF ENGINES
Filed Sept. 14, 1938    2 Sheets-Sheet 1
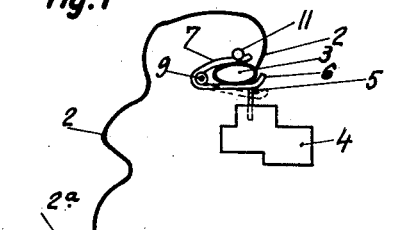
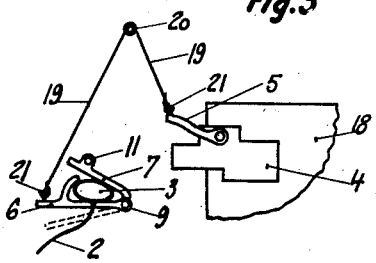
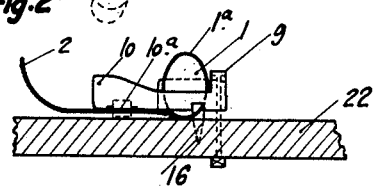
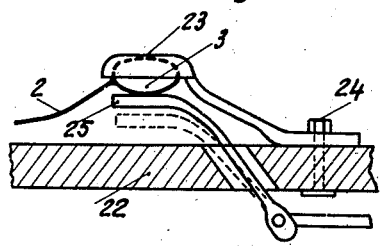
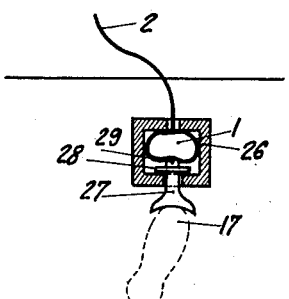
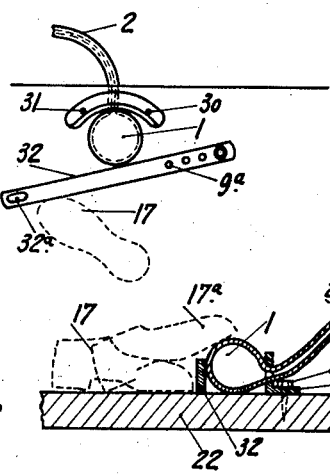
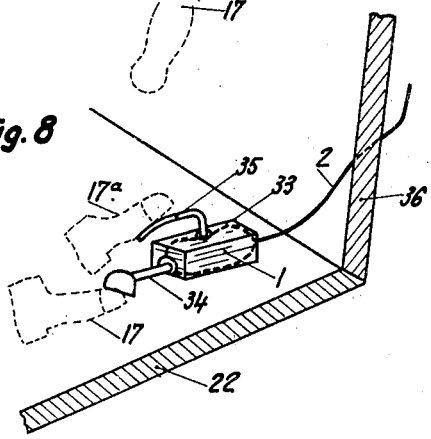
INVENTOR
George A. Rubissow Jan. 27, 1942.  G. A. RUBISSOW  2,270,900
VOLUMETRIC COMMAND-DEVICE FOR CONTROLLING OF OPERATION OF ENGINES
Filed Sept. 14, 1938  2 Sheets-Sheet 2

INVENTOR
George A. Rubissow

Patented Jan. 27, 1942

2,270,900

UNITED STATES PATENT OFFICE 2,270,900

VOLUMETRIC COMMAND-DEVICE FOR CONTROLLING OF OPERATION OF ENGINES

George A. Rubissow, New York, N. Y.

Application September 14, 1938, Serial No. 230,415

2 Claims. (Cl. 74—513)

There are mechanical control devices for actuating the throttle of a car engine, there are hydraulic piston devices for controlling of brakes, and many kinds of mechanical lever-commands for controlling of tools, steam engines, locomotives, etc. All these devices give more or less satisfactory results, but they have also many inconveniences and defects, especially such as: (1) permanent muscular stress provoking fatigue of muscles and nerves by the press-levers arrangements of the modern car, (2) too sudden and not sensible control of lever-commands in the case of lever not being long enough, (3) too much of pivoting levers and of articulations in the case when the commanding device is situated at a long distance from the part to be under operating control, (4) too much stress to be applied on account of friction or lever reaction forces to be overcome, etc. The present invention overcomes all these inconveniences and defects, and provides means for the most practical and the cheapest control arrangement, which could operate with any required accuracy, actuating simultaneously, or with any desirable negative-acceleration (retard), actuating at any distance from the operating part of the engine, operating with any desirable smoothness and progressivity—maintaining, however, the instantaneity of action if required—operating to overcome a great reaction by means of very small forces to be applied.

The present invention may be applied for any kind of controlling or operating devices and for any kind of engines or other machinery. For purposes of convenience this invention will be especially described in relation to accelerator, control devices of the engine, but this is done only by way of example, and does not limit its application to any other suitable use of it.

One aspect of this invention consists in a volumetric operating control-device A of an appropriate form, filled with any fluid or with any gas, which control device A may be compressed or depressed by the man's foot or hand, or other part of man's body, and by doing so the volume of the said device A is then diminished or augmented and the pressure in it is then diminishing or augmenting. This device A is communicating by means of an appropriate tube B with the volumetric reception-device C, (similar to A), which device is adopted to receive the variations of the pressures of the device A, in such a way that when the pressure is augmented in device A—it is communicated to the receiving device C—which device under the action of this pressure changes its volume, and by doing this it is operating by means of appropriate mechanics the operating part of the engine. Generally speaking, the operating cushion A should have preferably such a form that when the pressure P will be augmented to pressure $P_1$, the volume of the operating cushion will not increase. Forms like a ball, clips, pear, cushion-like are sometimes advisable. The receiving cushion C should be made, contrary to the operation cushion A, in such a form that it could easily augment its volume at least at one of its parts, and by doing so the said part or surface of the augmented volume will then press and operate the required member of the engine, or its accessory parts. If the operating body A is made from a not-easily extensible matter, the receiving body B may be made from extensible or non-extensible materials, may have a form wherein all surfaces, except the surface contacting the operating members, is made from an non-extensible material, or its form is so arranged that it may augment its volume, what could easily be done by means of harmonium-like form, membrane-like form, flat-cushion-like form, etc., and in these latter cases the material may be even non-extensible, and may be even flexible metal.

When using in this description the word operating cushion A or receiving cushion C, this will not limit the arrangements and devices described in the form of cushion. Any form of cushion—pear, or membrane, or harmonium-like, or box-form, etc., may be used.

This description is especially dealing with the compressor of the fluids or of the gases. However, this invention may also be employed by using the depression or vacuum instead of compression; then, accordingly, suitable arrangements should be made, and special resilient means or springs may be provided to remove the devices to their normal positions, to compensate the displacements or the reactions created by the vacuum or a part of the vacuum when they are applied to.

When, for instance, using a pneumatic transmission, the initial pressure in the system will be equal to the atmospheric pressure, then in this case the system A—B—C may work either (1) by using the pressure, or (2) by using the depression (vacuum) and this according to the corresponding arrangements of the operating and receiving devices A and B. It is also possible to arrange that in this case the system could work at the same time either with a depressor or with a compressor.

Another aspect of this invention refers to the case when the operating device A, the tube B and the reception device C are filled with any suitable liquid—then the system may be defined as operating hydraulically. The fluid may be any suitable fluid, any oil, or any liquid, or semi-liquid matter.

Another aspect of this invention refers to the case when the said devices A, B and C are filled with any kind of gas, or air, and the system may be called pneumatic.

Another aspect of this invention refers to the case when one part of A, B, and C is filled with fluids and another part of A, B, and C is filled with gas—then the system may be called hydraulico-pneumatic.

Another aspect of this invention refers to the initial pressure in devices A—B—C, which pressure—before any operation is done—may be (a) equal to the atmospheric pressure, or (b) higher than the atmospheric pressure, and in this latter case the devices A—B—C should be charged before the use by this required pressure of so many kg./cm.$^2$, as it is suitable for the operating part, or (c) it may be lower than the atmospheric pressure (this is especially recommended for the pneumatic gas filled system), or (d) it may be equal the atmospheric pressure, or it may be higher, but it should be suitable for working only under the depression, this is especially recommended for hydraulic systems.

In the cases a and b the operation will be done by compression, in cases c and d by depression or compression, speaking about the action applied to the devices A, which then provide a contrary (opposite) action throughout B and C.

Figure 11:
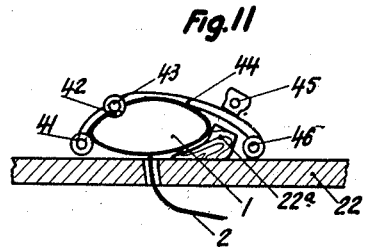
Figure 10:
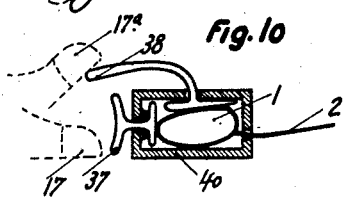
Figure 12:
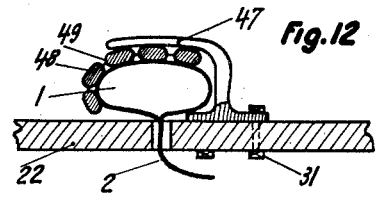
Figure 14:
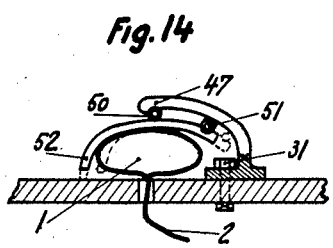
Figure 13:
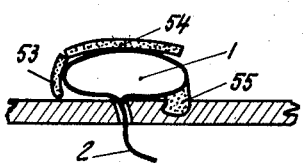
Figure 15:
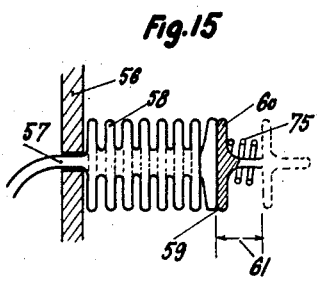
Figure 16:
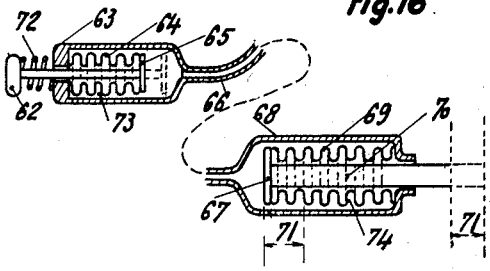
Figure 17:
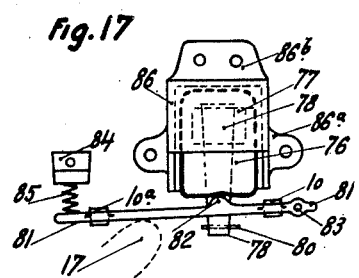
Figure 18:
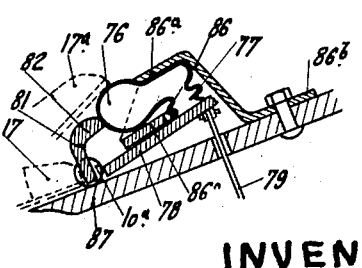

Some of the possible applications of the present invention are illustrated by way of schematical examples in the following figures:

Fig. 1—a plan view of a throttle foot operating device.
Fig. 2—a part of a cross view of Fig. 1.
Fig. 3—a side view of receiving device.
Fig. 4—a side view of an operating device.
Fig. 5—a plan view in section of a universal volume operating device.
Fig. 6—a plan view of an operating device.
Fig. 7—a cross section of Fig. 6.
Fig. 8—a perspective schematical view of a universal operating device.
Fig. 9—a plan view of a universal operating device.
Fig. 10—a cross section of Fig. 9.
Fig. 11—a cross schematical section of sliding compression pear operating device.
Fig. 12—a schematical cross section of compression-operating device.
Fig. 13—a schematical cross section of a compression-operating device.
Fig. 14—a schematical cross section view of a roller sliding compensation operating device.
Figs. 15 and 16—a membrane volume device.
Figs. 17 and 18—a one-body operating device.

The following detailed interpretation of these drawings gives many of the various aspects of the present invention.

Figs. 1 and 2 represent schematically an operating device 1A combined by means of a tubular connection 2B with the reception device 3C. The operating device 1 and the receiving device 2 may be made of any suitable material, such as rubber, or water—or air—or gas—or oil-tight materials, such as an appropriate cloth or leather, etc., or other elastic or semi-elastic or flexible material. The tube 2 may be made of any material, or rubber, or cloth, or plastic materials or metals, etc., according to the conditions in which it will be in service.

4 is the schematical view of a carburator of a car or of another engine.

5 is the accelerator throttle of the carburator.

The operating device 1 in the form of an appropriate pear or a cushion (hermetically tight) is placed on a rigid arresting surface (or face) 8 and may be compressed by the pivoting movement of the operating lever or the like 10, pivoting around the axle 9. The face part 8 is fixed rigidly on the chassis or on the floor of the body of the car by a fixating mean 12 and also (eventually) by the axle 9. When the operating lever 10 is displaced by the foot of the operator, the pear 1 is compressed against the face 8, and the increased pressure $P_1$ is transmitted via the tube 2 by the fluid or the gas to the reception device 3, where this pressure $P_1$ provokes the increase of the volume of the reception cushion 3, which operating cushion 3 moves the lever 6 actuating the throttle 5. The lever 6 is pivoting on the axle 9, the arresting face 7 is fixed to the body of the engine or the chassis by means of fixation 11.

The cushions 1 or 3 may be of any desirable form.

The levers 6 and 10 may touch the cushions 1 and 3 on the whole side-face or in a part of it, and these levers 6 and 10 may be, therefore, of any form.

The fixed lever or fixed face arrangements 7 and 8 may be of any form, and preferably should be contoured to the appropriate peripheric-surface or surfaces of the operating and receiving cushions.

The levers 6 and 10 may also be fixed to the body by means of axle 9, besides that the axle 9 serves at the same time as fixation for 7 and 8. In this case 7 and 8 may be entirely separated from 6 and 10, or may be even replaced by a suitable body's or engine's or chassis' surface.

The lever 10 may be provided with a roller 10a, which roller rolls on the floor and facilitates the displacement of the lever, maintaining its position parallel or as required in relation to the floor.

9 and 9a may be any kind of articulations, link, or the like.

14 is a compensation-pear-device, which may be especially provided for the purpose of correcting the initial pressure of the system A—B—C. If, for instance, this initial pressure would be equal to P kg./cm.$^2$ than after a long operation this pressure may become smaller than P, on account of eventual leakage of the fluid or the gas. To fulfill this leakage the compensation pear may be used by compressing it by hand or foot. This compensation pear 14 may be provided with an inlet valve 15 and a non-return outlet valve 13, and is connected to the system A—B—C by means of a tube 2a.

This compensation pear 14 may be also used as an adjustment device which adjusts the pressure P to the initial reaction of the accelerator of the carburator.

To provide air for the compensation pear 14, in case of pneumatic systems working with the air, such air may be taken directly from the atmosphere.

In case of a hydraulic system working, for instance, with a lubricant, there should be provided a reserve tank to which the inlet valve 15 is connected by a tubular member. The reserve tank is not shown in the drawings.

16 is an arresting mean of any suitable form fixed on the body of the car, and placed in such a way that the lever 10 when moving around the axle 9 is prevented to move farther than until it touches the arresting mean 16. This is especially important if the pressure P may change the peripheric face position of the operating device 1, so that the lever 10 may occupy an abnormal position.

17 and 17a is a foot or a shoe of the operator—when operating by sliding or moving along the floor 17 or when pressing downwards 17a.

Fig. 3 is a special arrangement wherein the throttle 5 of the carburator 4 fixed on the engine 18 is interconnected with the operating lever 6 of the reception cushion 3 by means of a flexible connection 19 passing through the roller or sliding devices 20 and combining the throttle 5 in the fixation point 2 with the lever 6 in the fixation point 21a.

Fig. 4 represents an existing accelerator-pedal, as usually employed in a modern car, an arresting mean 23 and 23a is fixed rigidly on the floor 22 by means of a bolt, or screw, or the like 24. The reception cushion 3 is placed between the pedal 25 and the arresting mean 23. The reception cushion 3 is connected by the tube 2 with the operating device 1, not shown in this figure.

When the volume of 3 increases, the accelerator-pedal 25 is pressed down (similarly if this pedal 25 were the lever 6 and the arresting mean 23 were the face 7 in Fig. 1).

Fig. 5 represents a casing 26 made from any suitable material, in which casing is placed the cushion 1 and the inner part of the pusher 27. 28 is an arresting mean of the pusher 27 to prevent the push 27 from getting out from the casing. The casing may be a cube, as shown in the drawing, it may be also of any other form, flat or curved, closed from all sides or only from a suitable part. 29 is a contacting part of the pusher 27, which part 29 presses on the cushion 1. The initial pressure P in the cushion 1 may keep the pusher in its "normal" or so called "ticking over" position—or, if necessary, a light spring of any suitable form may be provided to help to return the pusher after action to its normal position. (Springs are not shown in the drawings.)

Figs. 6 and 7 represent an operating device A in the form of an ordinary pear device of flexible material resting on the arresting mean 30, fixed rigidly on the floor 22 by means of screws 31. The foot of the operator may operate the cushion 1 by pressing it on its top, as shown in Fig. 7 (17a) or it may compress the cushion 1 sidewise by moving or sliding the foot 17, Fig. 6, or Fig. 7, on the floor 22, and by moving the lever 32. The lever 32 is articulated in axle 9a. The lever 32 may be provided with a roller 32a to facilitate the movements of the lever and to prevent the useless friction between the lever and the floor, in case that the lever would touch the floor. Arresting means for determination of the maximum or minimum displacements of the lever may be provided (not shown in the drawing).

Fig. 8 represents a universal box-operating-cushion device A. The cushion 1 is placed in a box-like-casing 33 of any suitable flat or curved surface-form. The pedal 35 is provided on the top of the casing 33 and when this pedal is pressed down by the foot 17a the cushion 1 is compressed. The pusher 34 is actuating similarly to the pusher 27 in Fig. 5, and may be operating by sliding or moving the foot on the floor 22. This universal box 33 enables the operator to use either (1) the pressure on the 35, or (2) the pusher, according to what the operator prefers at the moment.

Figs. 9–10 represent a plan view of a similar box-casing operating device A, as described in Fig. 8. The lever 38 is serving for pressure similar to 35 in Fig. 8, and the lever 37 is a lever replacing the pusher 34 in Fig. 8. This lever 37 is a two-hands lever, so that the foot 17 may actuate it either from its left, or from its right side by moving it, or the foot may simply press it in the middle like the pusher 34, Fig. 8. In Figs. 9 and 10 is shown that part of the lever 38 or the lever 37 which contacts inside of the casing 40. The cushion 1 has certain surfaces, and the choice of the dimensions of these surfaces must correspond to the reactions to be obtained. One part of these surfaces may serve only for contacting the box itself, another one or the same part may also contact simultaneously or not the corresponding part of the cushion.

In certain cases the lever 37 and 38 may be combined in one single lever, for instance, the inner parts of the lever 37 and 38 may be combined in one device, having at least two different levers, one acting similarly to 37, and the other similarly to 38, when the latter is operating it may compress the cushion independently of the operation of the lever 37.

Fig. 11 represents an articulating and movable surface-cover 42—44 which covers the cushion 1. 41 is a roller or similar device to enable to displace the surface-lever part 42 around the articulation 43. Furthermore, 42 and 44 may be pushed substantially parallel to 22, and the roller 46 is provided to diminish the friction. 45 is an arresting mean, which also may be a roller (not shown). The operator's foot may press on 41—42—43—44 or may push them.

22a is an arresting mean provided on the floor to keep the cushion in position.

Fig. 12 represents a cushion 1 covered by a layer consisting of a plurality of parallel strip-like bodies 48 combined between them by elastic or flexible, or rigid-link means 49. The bodies 48 may be made from wood, metal, cork, rubber, leather, or any other material. 47 is an arresting means fixed to the floor 22 by 31 and it serves to keep in a required position the cushion 1 and the bodies 48, which bodies 48 may be fixed rigidly by their non-operating end to the said arresting mean 47.

Fig. 13 is a variation of Fig. 12, wherein the arresting means 42 may be eliminated or reduced, if desired, and the bodies 48 may be reduced in quantity to two members or even to one body. These bodies 53 and/or 54 may be made from any material, and may be, if necessary, adhered to or stuck to the surfaces of the cushion 1. The arresting mean 55 is also shown as sticking to the cushion 55 and pressed on or fixed on the floor.

Fig. 15 represents a receiving membrane made from any suitable material, i. e. from a suitable foil of metal, or metal alloys, or rubber, cloth, or plastic material, etc., preferably of materials easily flexible. The membrane may be of any suitable form and dimension, and may have one or a plurality of compartments or elements. The membrane may be one or more stages membrane. 56 is the body of the chassis or of the engine; 57 is a tubular connection (similar to 2 in Fig. 1. 58 is the membrane. 59 is a layer between the pusher 60 and the top of the membrane 58. This layer may be a solid, rigid layer, or a very soft, sponge-rubber layer, conforming to the use required. This layer may also be eliminated. 60 is the pusher. This membrane 58 may replace the receiving device 3 in Fig. 1.

When the pressure P is augmented to $P_1$ ($P_1 > P$), then the membrane 58 is augmenting its volume by becoming longer, and the pusher 60 makes a displacement equal to i. e. 61, as is shown schematically. Spring arrangement 75 may be employed, if necessary.

Fig. 16 shows schematically an operating membrane 64 placed in a casing 63. The membrane is hermetically attached to the casing 63 and also hermetically attached to the end 65 of the pusher 62. The pusher 62 may be moved loosely and freely inside of the membrane. A spring 72 may be provided, if necessary, to help to return the pusher after its release. When the pusher 62—65 is pushed into the casing 63 then the membrane augments the volume and, therefore, the pressure of the fluid or of gas 73 is also augmented. This pressure $P_1$ is then transmitted throughout the tube 66 to the receiving membrane 69, mounted in casing 68. The pressure in 74 is then also equal to $P_1$, and the membrane 69 is then compressed in the only one possible for its compression direction, that means that the receiving pusher 67 and 70 is pushed and makes the displacement 71.

Instead of membranes and pusher, an ordinary cylinder and piston may be used. This, however, may be preferably employed in cases when the friction and the tightness between the piston and the cylinder could be neglected without prejudice, in connection with the results to be obtained from such a device when in use.

It may also be remarked that if a simultaneous transmission of the pressure from the operating membrane A to the receiving membrane C, (which receiving membrane C is the executive membrane) is required—then the diameter of the tubular connection should be such that the friction between the fluid and the gas passing throughout would not excessively delay the operating action. On the contrary, a suitable diaphragm will be put on the way between the operating (A) and receiving (B) membranes, then, if this diaphragm will be sufficiently small, a certain amount of time will be required to transmit the pressure from A to B. This is important for certain types of devices.

The simplest way to provide the tubular connection with a diaphragm is that of a clock-like device with a number of holes of different diameters.

The said schematical drawings from 1 to 16 inclusive have been given by way of not-limiting example in relation to the carburator of a car-engine, they may be, however, employed accordingly for any other type of controlling devices, and for other purposes.

Figs. 17 and 18 represent a special "one-body" operating device, in which device the operating cushion A, the tube B, and the receiving cushion C are combined in one body cushion 76.

This cushion may eventually have one membrane-like or harmonium-like section 77, which section 77 is the operating-receiver part section, corresponding to the receiving cushion C, and 77 produces the effectual command when the pressure in 76 is increased.

78 is the accelerator pedal.

79 is the lever from the accelerator pedal to the throttle.

80 is the articulation of 78.

81 is the operating lever or the like; it is articulated in 83, and provided with a spring or resilient means in 85, which spring 85 is fixed upon an arresting means 84, or upon a part of the floor 84.

When the foot 17 moves the operating lever 81, then the compressing of the cushion 76 is made by means of a part 82 of the lever 81, which part 82 is arranged in a suitable form to provide this or that compression by this or that displacement of the foot (or the lever 81).

The cushion 76 may be mounted or lodged in an appropriate rigid casing 86, attached to the floor 87 by its part 86b and keeping the cushion 76 in a predetermined position by means of 86, 86a. 10a is a roller, which may be provided, as described in Figs. 1 and 2.

The cushion 76 may be provided with a compensation pear, as described in Fig. 1. (Not shown in Figs. 17 or 18.)

Instead of the cushion, other devices equivalent in action may also be employed, such as (1) a cylinder-body provided with two or more differential pistons, actuating in corresponding cylinders, which pistons may be of different diameters, or, (2) different devices including one or more metallic membranes or of other materials.

This variation provides another aspect of the invention, wherein the use of the existing type of an accelerator pedal may be combined with the said one-body device.

Another important feature and aspect of this invention is the simultaneous use of friction created between the footwear and the floor as a compensation, a replacement, of the muscular stress usually maintained for keeping of the throttle in operation have been fully described in Patent No. 2,235,850 granted March 25, 1941, and Patent No. 2,235,851 granted March 25, 1941.

It is known that several hours of driving in succession every day very often seriously affects the driver, causing cramps in the foot, tiring the foot, affects the nerves and often even paralyzes the foot, affects the sciatic nerve and the muscles. All these occurrences are due to the defective arrangement of the accelerator pedal, such as is generally used until now in the car and commercial bus. The drivers of the bus or of the car are so preoccupied with the driving itself—which requires a lot of permanent attention—that they do not realize the deleterious action of the constant tension of the nerves and muscles of the operating foot.

One of the further aspects of this invention is to overcome these disadvantages and to provide means whereby the foot, whilst actuating the accelerator pedal and throttle, is always remaining in a normal position, freely resting on the floor, which position is during the operation or during the non-operation exactly the same, varying only the place where the foot is resting on the floor.

This aspect consists in using the items and devices and systems described in this application (pneumatical, or hydraulic, or a combination of both) in combination of the whole or of a part or of the frictional force created between the floor and the sole or the heel, or both, of the driver's footwear, when the footwear is resting freely on the surface of the floor, on which the footwear may be displaced by ordinary sliding or moving of the latter.

Considering for the simplification of the description that G (throttle) will be the total reaction (in kg.) of the accelerator arrangement, including (if provided) the throttle, the levers of transmission, the resilient element, springs, and so forth, and including the reaction of one of the pneumatic, or hydraulic, or pneumatico-hydraulic devices, as described in this application G (foot) will be the passive weight (in kg.) of the part of the human body (generally comprising the foot, a part of the body, and a part of the leg, footwear, clothes) which is the weight resting freely on a part of the floor without any application of any intentional muscular stress of the driver. The amount of G (foot) is measured in kg.

Another aspect of this invention foresees that the friction created by the G (foot) between the footwear and the surface of the floor, upon which the footwear is resting when in operation, must be at least equal, but preferably larger, than the G (throttle).

The friction depends upon, as is known from the friction coefficient "$c$"—so that Friction=$f=c.G$ (foot) =G (throttle)

When this equation is in force, then the body or the foot of the driver is absolutely free from any intentional muscular stress, and practically there is no difference between the foot resting on the floor of a man sitting in the cinema, or the foot of a man operating the accelerator pedal, in accordance with this aspect of this invention.

The rational use of the friction:

$$f=c.G \text{ (foot)} = G \text{ (thr.)}$$

may be realized with the assistance of the following:

Or *aa*—any pneumatic volumetric operating device.

Or *bb*—any hydraulic volumetric operating device.

Or *cc*—a combination of a hydraulic *bb* and pneumatic *aa*.

Or *dd*—of mechanic-operating devices, such as levers, or rollers, or flexible connections, and so forth, as described in this application, as well as in the Patent No. 2,235,850 granted March 25, 1941 and Patent No. 2,235,851 granted March 25, 1941, which mechanical operating devices are combined with one or more of the abovementioned *aa*, *bb*, or *cc* devices.

By way of example, let us consider, for instance, Fig. 9 and Fig. 10—where the foot 17, when sliding or displaced on the floor, is pressing by contacting the lever 37, then this lever 37 opposes to such a pressure of the foot a reaction, which reaction, according to the aforementioned, is equal to G (throttle). The foot 17 has a passive resting weight=G (foot), therefore, it should be: $f=c.G$ (foot) =G (throttle).

It may be stated that the amount of G (foot) is more or less given, because the average passive weight of a driver's foot measured when freely resting on the floor is more or less a definite figure of so many kg. The friction coefficient $c$ may be also more or less defined in advance, because the majority of the man's foot-wear is in leather or in rubber, etc., and generally the floors of the cars are covered with rubber or linoleum compositions,—this coefficient $c$ will be, therefore, more or less also a definite figure. Therefore, the choice of G (foot) and $c$ is limited to their existing limits. Many more free possibilities are offered by the choice of the G (throttle). The amount of G (throttle) may be entirely chosen by the constructor of the operating device, because of the choice of levers, of lever lengths, rollers, springs, and so forth, as well as the choice of the volumes of the operating cushion A and of receiving cushion C are free within reasonable limits of practicability. If, therefore, $f=1$ kg. (for instance, and in the way of example only)—then it is easy to provide G (throttle) $f=1$ kg. If in this case, for instance, the reaction of the throttle itself will be 3 kg.—then the active surface of the pressure of the receiving cushion C must be at least 3 times bigger than the active surface of the operating cushion A, which may be very easily realized.

Another aspect of this invention consists in the rational choice between the volumes and the active surfaces transmitting the pressures of the operating cushion A and the receiving cushion C. The choice of the displacement of the pusher or the lever or the like, operating the operating-cushion A, may be done in accordance with the smoothness or the progressivity of the required control.

Having now described and ascertained the nature of this invention and in what manner said invention operates, I declare to what I claim:

1. In combination with the throttle of a vehicle, a device consisting of a rigid casing rigidly affixed in respect to the flooring, said casing containing a pneumatic bulb filled with a substance under pressure, two levers mounted through an opening in the said casing, each of said two levers being provided with a surface adjacently connected to said bulb, each of said levers adapted to compress said bulb when each said lever is moved to and fro by the foot of the driver, said bulb being connected by a pneumatic tubular connection to another bulb rigidly affixed in respect to the throttle of the carburetor through the intermediary of a pivotal lever, whereby when the compression is increased in the bulb of the said casing, the said compression is thereafter transmitted to the said other bulb and the said throttle is actuated accordingly.

2. A device as set forth in claim 1 wherein one of the said two levers is mounted in the front of the said casing adjacent to the floor, and the other lever is mounted on the top of the said casing, the first of the said levers being actuated by a to and fro movement of the shoe, and the second of the said levers being actuated by an up and down movement of the shoe.

GEORGE A. RUBISSOW